United States Patent

[11] 3,562,502

[72] Inventor William H. Kautz
Woodside, Calif.
[21] Appl No 660,271
[22] Filed Aug. 14, 1967
[45] Patented Feb. 9, 1971
[73] Assignee Stanford Research Institute
Menlo Park, Calif.
a corporation of California

[54] CELLULAR THRESHOLD ARRAY FOR PROVIDING OUTPUTS REPRESENTING A COMPLEX WEIGHTING FUNCTION OF INPUTS
12 Claims, 3 Drawing Figs.

[52] U.S. Cl. .......... 235/152, 235/164, 340/146.3
[51] Int. Cl. .......... G06f 7/38, G06k 9/06
[50] Field of Search .......... 235/152, 156, 164; 340/146.3

[56] References Cited
UNITED STATES PATENTS

| | | | |
|---|---|---|---|
| 3,296,426 | 1/1967 | Ball .......... | 235/175 |
| 3,407,290 | 10/1968 | Atrubin .......... | 235/164 |
| 3,226,688 | 12/1965 | Amdahl et al. .......... | 235/152X |
| 3,377,472 | 4/1968 | Potter .......... | 235/152 |

OTHER REFERENCES
Willette " Binary Adder" IBM Technical Disclosure Bulletin Sept. 1963 pp. 39 – 40.

*Primary Examiner*—Malcolm A. Morrison
*Assistant Examiner*—David H. Malzahn
*Attorney*—James Todorovic and Lindenber and Freilich

ABSTRACT: A digital logic network for indicating whether a number of inputs, after appropriate weighting, is more or less than a particular threshold. The network utilizes an array of identical cells, each connected only to the immediately adjacent cells, to provide a two-dimensional arrangement adapted for realization by integrated semiconductor technology.

INVENTOR.
WILLIAM H. KAUTZ
BY Lindenberg & Freilich
ATTORNEYS

CELLULAR THRESHOLD ARRAY FOR PROVIDING OUTPUTS REPRESENTING A COMPLEX WEIGHTING FUNCTION OF INPUTS

BACKGROUND OF THE INVENTION

This invention relates to digital logic circuits.

One of the newer areas of technology concerns the development of machines for automatically recognizing patterns, and for automatically learning to attribute proper weight to various characteristics of patterns so as to more accurately classify them. For example, such machines are able to identify printed handwritten letters of the alphabet which may have various forms, and to perform similar tasks requiring pattern classification.

One approach to pattern classification machine design involves the use of many logic networks, each adapted to receive a number of inputs from an unclassified pattern, such as the brightness at various points of a picture. Each of the inputs is weighted, that is, multiplied by a predetermined number, and these weighted inputs are added to obtain their sum. The sum of a particular group of weighted inputs is compared to a threshold to determine whether the weighted sum is less than the threshold. The output of the logic circuit is a one or zero depending upon whether or not it is less than the threshold.

The outputs from a large number of such logic circuits are utilized as the input to a master logic circuit which performs a similar type of weighting and comparison with a threshold. Alternatively, this process may continue for one or more additional levels. The output of the final logic circuit determines whether the pattern is probably of a particular type or not.

To allow the pattern recognition machine to learn to more accurately classify patterns, means are provided for changing the weighting given to each particular set of inputs depending upon whether the pattern classification in the previous attempt was accurate or not. Thus, in one such adaptation scheme, if a pattern was correctly classified, the weighting at each input which was one (as opposed to a zero) is increased slightly, so that the next time an input is delivered there, a greater weighting will be attributed to it. Similarly, at those inputs which were zero during the classification which happened to be accurate, the weightings are decreased slightly. It can be understood that in sophisticated pattern recognition machines of this type, a large number of logic circuits must be provided. Accordingly, an approach to design of such circuits which enables their more economical manufacture and utilization would greatly enhance the development of such machines.

Heretofore, logic circuits of the type utilized in pattern recognition machines, and in other similar applications, have been designed as networks of components constructed in a complex manner. This resulted in the great expenditure of effort in design, fabrication, testing, and diagnosis of failures, and such circuits have not been readily adaptable for manufacture by integrated circuit technology and other advanced methods which would make production economical. Logic circuits of the type useful in threshold comparison which could be economically designed, fabricated, and diagnosed for failures in a simple manner, and using advanced techniques, would contribute significantly to the advancement of pattern recognition machines and other devices.

SUMMARY OF THE INVENTION

This invention provides a threshold function circuit in the form of an array of identical cells connected to each other in an identical manner. The cells are arranged in a two-dimensional structure which is well adapted for fabrication by integrated semiconductor technology. As a result of the fact that the cells are identical, it is economical to apply large efforts to the design of the individual cell and its connections, enabling high efficiency and reliability. Inasmuch as each cell in the array is connected only to its immediate neighboring cells, the array has short interconnections and gates with low fan-in and fan-out (few inputs to each gate, and the output of each gate drives few other gates); therefore, the array enables the use of low power levels, high packing, and high speed, and in an integrated circuit realization.

The array includes a large number of identical cells arranged in rows and columns. Each row stores an input weight and the weights are added selectively within the array. Each row of cells has a row bus which connects to all cells thereof so that a sample from the pattern (the sample being zero or one) is applied to all cells of a row. The row of cells multiplies this input sample by the weight stored in the row.

The cells of each column of the array are serially connected to enable the addition of the weight value stored in each cell to the sum received from the preceding cell in the column. The sum generated by each cell is delivered to the succeeding cell in the same column, and any carry which results is delivered to the next cell in the same row, which stores the next most significant digit of the weight. The last row, therefore, generates a number equal to the sum of all numbers in the preceding rows. This sum may be compared with a threshold number in a variety of ways, to determine if it is less than that threshold number. If the sum is equal to or greater than the threshold number, the array has a 0 output, and if it is less than the threshold, the array has a 1 output.

Each row of the array is provided with a trigger input for changing the weight stored in the row after each pattern recognition has been attempted. If the pattern recognition has been successful, each row which received a 1 input from the pattern has its weight reinforced by increasing the weight number by one, and each row which received a 0 input during the pattern recognition has its weight reduced by one.

The construction of the individual cell of the array includes a weight flip-flop which may be set or reset to represent one or zero, respectively. The output of the flip-flop is multiplied by the pattern signal on the row bus by delivering this output and the row bus signal to an AND gate, whose output is one only when the cell has a weight of one and the pattern input is one. This output is added in binary fashion to the column output of the preceding cell of the same column and the row output of the preceding cell of the same row. If the sum of these three inputs is one or three, a pulse is delivered to the succeeding cell in the same column, and if the sum is two or three, a carry is generated which is delivered to the succeeding cell of the same row. In this way, the weights in all rows in the array are added together. During the adaptation period of use of a machine, after a pattern is either correctly or incorrectly classified, the trigger inputs change the weight of each row by increasing or decreasing it in the fashion of a binary counter.

The array accommodates negative numbers in so-called "two's complement" form, by designating numbers above a certain value as negative. As a result, the array has high versatility in ability to serve in adaptive pattern recognition machines.

DESCRIPTION OF THE PREFERRED EMBODIMENTS

Figure 1:
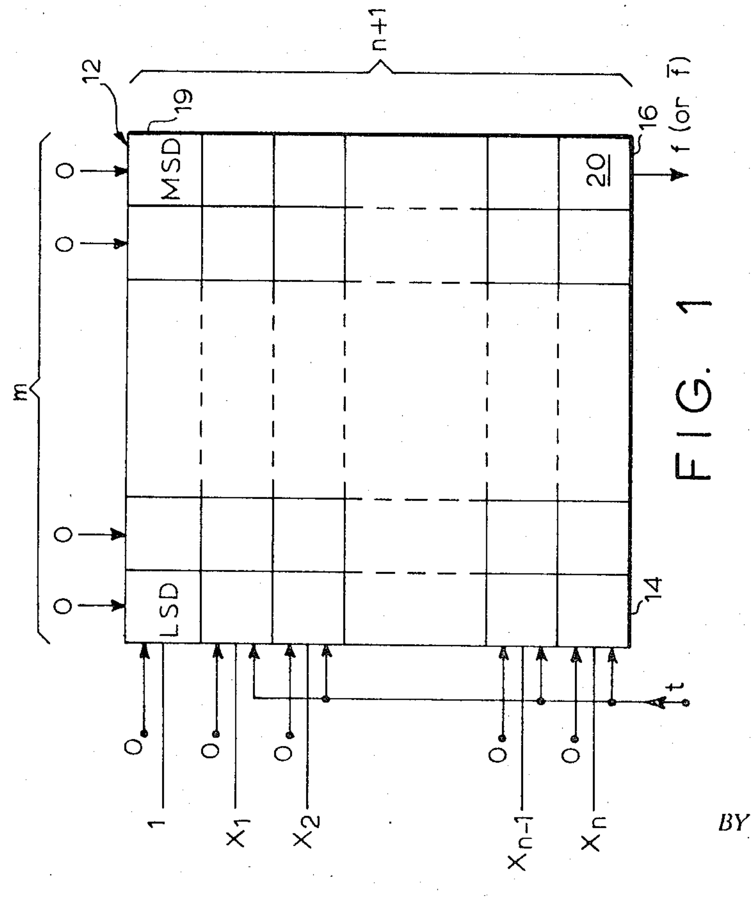
FIG. 1 is a representation of a cellular threshold array constructed in accordance with the present invention.

FIG. 1 illustrates an embodiment of the invention comprising an array 12 of cells arranged in columns and rows, there being a number *m* of columns and a number *n*+1 of rows, and the array having numerous connection terminals along its edges. The *m* cells of each row store a weight, each of the cells being in one of two binary states for contributing one binary digit to the weight number of the row. The least significant digit of each number is contained in the cell of the leftmost column labeled 14, while the most significant digit is contained in the cell of the rightmost column labeled 16. Prior to the use of the array, a number $n+1$ of weights (one for each row) is entered into the array by placing all cells in one of two binary states, the cells of each row being in states representing one weight number. The array then receives pattern detecting inputs on its $x$ lines labeled $1, x_1, x_2, \ldots x_n$ (the first $x$ line) with a fixed 1 input is provided because the threshold number is entered there, as will be later explained.

The $x$ inputs are binary digits, each of the inputs being bussed to all cells in the row to which it is connected. The source of such $x$ inputs may be a pattern sensing device, for example, a mechanism for scanning the pattern displayed on a cathode ray tube, and for generating a one or zero signal from each spot of light on the tube. This output is delivered to an $x$ input associated with that spot. The $x$ input to each cell is multiplied within the cell by the weighting state of the cell, so that each cell generates a zero or one. The product of the multiplication is added to the sum digit received from the preceding row located above, and the resulting sum digit delivered to the succeeding row located below.

The addition of the products generated in the rows is accomplished by constructing each cell so it adds the digit (zero or one) it generates to the input received from the preceding cell in the same column (located above it) plus any carry input received from the preceding cell of the same row, located to the left (which carries the next least significant digit). The binary sum generated in each cell can have a maximum value of three, which can be represented as a binary sum digit and a binary carry. The sum digit is delivered to the succeeding cell in the same column (below) while the carry is delivered to the succeeding cell (to the right) in the same row. This results in each row generating a sum equal to the product of its stored weight times its $x$ input, plus the similar products generated in all of the preceding rows. The last row, having an input $x_n$, generates the sum of the products formed in all preceding rows plus the product formed in the last row.

Inasmuch as the array adds or fails to add the weight of each row in accordance with the binary $x$ input to the row, the array may also be described as an adder of weights. The weight stored in each row is therefore gated to the adding means in accordance with the $x$ input to each row, and the adding means adds all of the weights it receives. Such adding means is provided in the form of a series of adders, each row containing one adder, and each adder adding the weight of its row (times the $x$ input to the row) to the weight generated by the adder of the next preceding row.

The array 12 can be used to determine, in a variety of ways, whether the sum of the products generated in all of the rows is less than a certain threshold number. One method would be to utilize a separate means for comparing the sum output of the last row with a threshold number in order to determine which is larger. A simpler way can be used since the array 12 of FIG. 1 is adapted to handle both positive and negative numbers. The negative of the threshold number is entered into one of the rows on which a fixed 1 signal is applied to the row bus. If the sum generated by the last row is negative, then this indicates that the sum of the products is less than the threshold. If the sum generated by the last row is positive, or zero, this indicates that the sum of products is equal to or greater than the threshold.

Negative numbers can be stored in the array 12 in a simple manner by the designation of certain large numbers as negative numbers. The threshold number is entered as the negative of its actual value in the first row indicated at 19. The determination of whether the sum of the products generated in the other rows of the array is less than the threshold or not is made by noting whether the output $f$ from the cell 20, which is the most significant digit of the last row, is one or zero, respectively. A more complete explanation of this method will be given hereinafter.

After the threshold comparison is made, as by determining whether the $f$ output is zero or one, it may be desirable to automatically change the weighting in each of the rows. In an adaptive system, the circuit can "learn" by providing means for comparing the output of the system with an independent determination of what the system output should be. If, for the particular $x$ inputs and weighting used, the system output is as desired (zero or one), then the weight may be increased by one for each row in which $x$ was one and the weight may be decreased by one for each row in which $x$ was zero. This is accomplished by delivering a pulse to the trigger input $t$. An input as $t$ causes each row to count up or down by one, depending upon the value of the $x$ input to the row.

Figure 2:
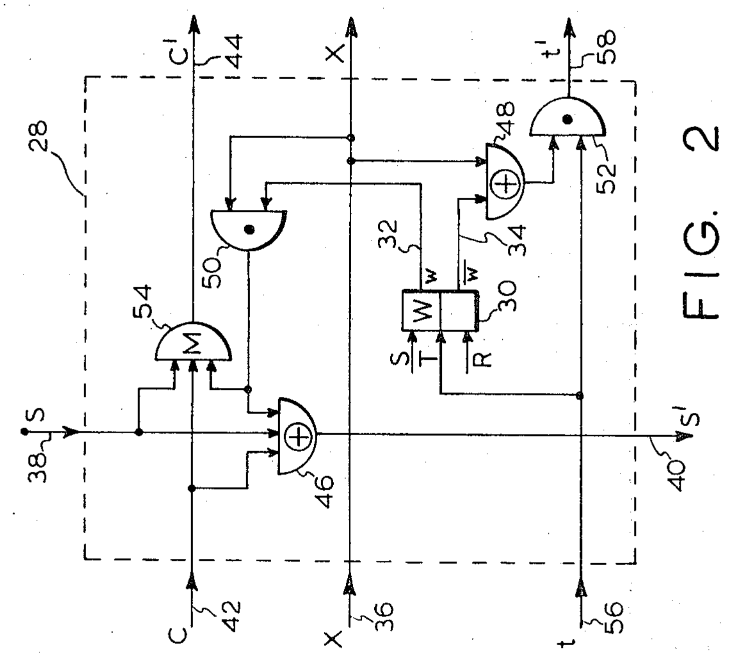
FIG. 2 is a schematic diagram of a cell of the array of FIG. 1.

Each individual cell of the array has a circuit which is shown in FIG. 2. A W flip-flop 30 has set and reset states, an output 32 labeled $w$ being the true or 1 or set output and an output 34 labeled $\bar{w}$ being the false or 0 or reset output. The flip-flop 30 has set and reset inputs, labeled S and R, respectively which receive signals that cause the flip-flop to deliver a one on its $w$ or $\bar{w}$ output, respectively. A pulse applied to a trigger input labeled T causes a change of state of the flip-flop. The condition of the flip-flop 30 determines whether the cell contributes to the weight of the row in which it lies; if the flip-flop 30 is set, it makes a contribution, and if reset it does not make a contribution.

The W flip-flop therefore serves as a memory representing a binary digit. After all cells of the array are placed in the desired state (set or reset), a threshold comparison can be made by delivering a binary input to the $x$ bus 36 which connects to all cells of a row. Each cell receives a binary input from the preceding column cell located above it over the sum line 38 labeled $s$, and delivers a binary output to the succeeding column cell located below it over sum output line 40 labeled $s'$. The cell 28 receives binary inputs from the preceding cell of the same row (to the left) over carry input line 42 labeled $c$, and delivers binary outputs to the succeeding cell of the same row (to the right) over carry output line 44 labeled $c'$. The cell 28 contains five gates, which govern the relationship between inputs and outputs, including two exclusive-OR gates 46 and 48, two AND gates 50 and 52, and a majority gate 54, which delivers an output only when two or more of its inputs is a one.

In the course of a threshold comparison, the cell 28 receives three inputs, on the $x$, $c$, and $s$ input lines, and delivers outputs on its output lines $s'$ and $c'$. The generation of a sum equal to zero is indicated by the existence of a zero on outputs $s'$ and $c'$. The generation of a sum equal to one is indicated by the delivery of a one on output $s'$ and a zero on the output $c'$. A sum of two is indicated by a one output on line $c'$ and a zero output on output $s'$, while a sum equal to three is indicated by a one on both lines $s'$ and $c'$.

If the flip-flop 30 of a cell is set, so that it contributes a weight digit equal to one, and if the $x$ input is one, then both of the inputs to AND gate 50 are one and the AND gate 50 delivers a one to exclusive-OR gate 46. If a one is received on sum input 38, it is delivered to another input of exclusive-OR gate 46, and if a one input is received over carry input 42, it is delivered to still another input of exclusive-OR gate 46. If the exclusive-OR gate 46 receives an input on one or three of its input ports, it delivers a one on its output line 40. If the exclusive-OR gate 46 receives a one input on either none of its input ports or two of them, then it delivers a zero on its output 40. The gate 46 therefore serves as a means for generating the modulo-two sum of the binary inputs to the cell. The majority gate 54 has three input ports, which are connected to the sum input 38, the carry input 42, and the output of the AND gate 50. If at least two of these inputs to a majority gate 54 is a one, then gate 54 delivers a one on its output 44. Accordingly, for a cell, contributing a weight digit, the sum of the three inputs is delivered in binary form, with the least significant digit delivered on output sum line 40 and any carry delivered on carry output line 44. The majority gate 54 therefore serves as a means for generating the carry of the binary sum of inputs to the cell. The inputs are those received over lines $s$ and $c$, which serve as means for connecting the cells in a column in tandem and means for connecting the cells in a row in tandem, and the input received from AND gate 50.

As a result of the operations performed by the cells and their interconnections, the output sum lines $s'$ of the group of cells constituting each row, represent the sum of all weighted inputs of that row and all preceding rows (above it). The least significant digit is the $s'$ output of the leftmost cell of the row and the most significant digit is the $s'$ output of the rightmost cell of that row. Accordingly, each row of cells constitutes a parallel binary adder, and the outputs are delivered to succeeding rows. Inasmuch as the top or first row of cells of the array receives no sum value on its $s$ input lines, these lines should receive zero column inputs in the array shown in FIG. 1. Similarly, the leftmost column of cells 14, representing the least significant digits, receive a zero carry input $c$, indicated by the zero inputs to each cell of the leftmost column 14 in the array of FIG. 1.

Figure 3:
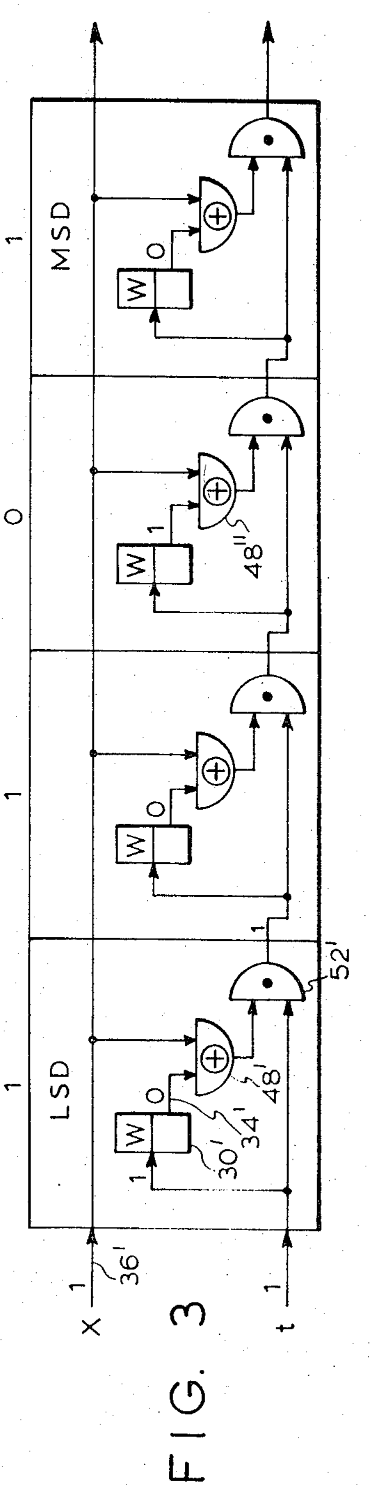
FIG. 3 is a partial representation of a simplified array, showing the process involved in changing the weight stored in one row of cells.

Each cell 28 has a trigger input 56 labeled $t$ and a trigger output 58 labeled $t'$. A single pulse on the trigger input 56 to the leftmost cell of a row causes changes in the weight stored in the cells of that row in a manner which increases or decreases the weight of the row by one. An understanding of the process by which the weighting is changed can be had by considering a simplified example, in connection with the four-cell row shown in FIG. 3. In the circuit of FIG. 3, only the weight changing portions of the cells are shown. The row of four binary cells of FIG. 3 has a weight of eleven, which can be designated by the binary number 1011, so that the two leftmost cells and the rightmost cell are in a one state (i.e., the W flip-flops are set) and the second from rightmost cell has a weight of zero (i.e., its W flip-flop is reset) (note that the most significant digit is in the rightmost cell). If a trigger input $t$ is delivered to the leftmost cell of the row, then the flip-flop will change from its set to a reset state.

The trigger input to the row is very brief, and lasts for a shorter period than is required for the flip-flop 30' to change its state. Therefore, during the time the trigger input is delivered to the row, flip-flop 30' remains set, and a zero input is delivered over its reset output 34' to exclusive-OR gate 48'. Assuming that the $x$ input to the row over line 36 is a one, then the $x$ input leading to exclusive-OR gate 48' is the only input therein, and gate 48' delivers a pulse to AND gate 52'. AND gate 52' therefore delivers a pulse on trigger output $t'$ to the next cell of the row. The next cell, which was in the one or set state will be triggered to change to the zero or reset state, and deliver a trigger pulse $t'$ to the third from leftmost cell of the row. The third from leftmost cell will change from a reset or zero state to a set or one state, but its reset output to its exclusive-OR gate before triggering will cause the output of exclusive-OR gate 48'' to be a zero, and will therefore prevent the rightmost cell from being triggered. Therefore, as a result of the trigger input to the leftmost cell, the two leftmost cells are now zero while the third from left cell is a one. The row then represents the binary number 1100, which is a 12 in the decimal system. Therefore, a trigger input to the leftmost cell increases the weight stored in the row by one if the $x$ input to the row is a one. By a similar tracing of pulses, it can be shown that an $x$ input of zero results in the decrease of the weight stored in the row by one. In describing the weight changing portion of the cell, the trigger input to the flip-flop in a cell may be described as a trigger means for changing the digit or weight contribution of that cell, while the AND gate leading to the $t'$ output may be described as another trigger means responsive to the digit in the cell and the trigger input to the cell.

While the array does not directly subtract numbers, negative numbers can be dealt with by appropriately designating them. Each row contains a number $m$ of cells, and can provide number $2^m$ of states. For example, a row of four cells can have 16 states, and can represent the numbers zero through 15. Negative numbers can be represented in two's complement form, so that a weight of value $w$ can be represented as the number $2^m - |w|$. Thus for a row with four cells, −1 can be represented as the binary number with value 15, −2 as the binary number with value 14, and so forth, up to −7 as the binary number with value 8. For a four cell row, for example, the addition of two binary numbers of value 15 (representing −1) and three (+3) will result in producing the sum 18, which has five places in its binary representation 10010. The fifth place will be lost, however, since there is no fifth cell to hold it, and the other four digits 0010 constitute a binary representation of the number two (+2) which is the result that would be obtained from computing three minus one. Thus, the array can deal with negative numbers by representing them in the two's complement form.

Any row of the array may be weighted with a negative number, but a negative representation is especially useful in representing the threshold, which is usually positive. Thus, the negative of the threshold number can be entered into the first row 19 in the array 12 of FIG. 1, by considering the threshold as a negative weight to be added to all of the other products generated in the array. At the same time as the inputs $x_1$ through $x_n$ are delivered to all of the other rows, a one is delivered to the $x$ input of the first row.

Alternatively, instead of utilizing a separate row to store the negative of the threshold, the top row of the array 12 in FIG. 1 may be deleted, and the negative threshold value, represented in the same binary form as was employed in the top row, may be injected into the top of the array as edge inputs, in place of the set of 0's shown at the top of FIG. 1.

A row of $m$ binary cells can represent the numbers 0 through $2^m - 1$. One-half of these numbers have a one in the most significant place. Thus, for example, in a group of four cells which can represent the numbers 0 through 15, one-half of the numbers—the numbers 8 through 15—have a one in their most significant place in the usual binary representation, and the other half—the numbers 0 through 7—have a zero in their most significant place. It is necessary to provide for a range of negative numbers approximately equal to the range of positive numbers in the array. All of such negative numbers, from −1 through $-2^{m-1}$, have a most significant digit (MSD) which is one; for example, for a group of four cells, the numbers −1 through −8, which are represented as the binary digits 8 through 15, all have a one as their MSD. Accordingly, if all numbers with a MSD of 1 are specified as negative, the existence of a negative number can be determined merely by noting whether the most significant digit in the number is a one or zero. In the array of FIG. 1, use is made of this by connecting the output of cell 20, which generates the MSD of the last row as the output $f$ of the array. If the threshold, entered into the first row in negative form, exceeds the sum of the products generated in the other rows, then the sum output of the last row will be a negative number. The existence of a negative number can be determined by noting if the $f$ output of cell 20 is a one.

If the complementary output, usually designated $\bar{f}$, is desired from the array, it is only necessary to change the rightmost edge input along the upper edge of the array from a 0 to a 1. This change may be viewed as propagating through the cascade of exclusive-OR gates 46 in each cell of the last column of the array until the $f$-output is reached, which output is then inverted. This same effect could be achieved in another way by inverting the stored contents of the W flip-flop in the upper rightmost cell of the array—that is, by storing in this single cell a 0 instead of a 1, or a 1 instead of a 0. An array which realizes the complementary function $\bar{f}$ instead of $f$ will then have an output equal to 1 when and only when the sum of the products generated in the array is equal to or greater than the threshold stored in negative form in the first row.

It should also be observed that if the threshold is equal to zero, then it contributes nothing to the summation performed in the array, and in this case the first row of the array is not needed. This case often arises in pattern recognition applications.

The individual cells of the array of FIG. 1 can be realized in a number of configurations of memory and logic components. The cell of FIG. 2 can be described by the logic equations relating its inputs to its outputs. For the cell of FIG. 2, the equations are:

$s' = s \oplus c \oplus wx$ $c' = M(s, c, wx)$ $t' = t(\bar{w} \oplus x)$ $w^* = w \oplus t$ where $s$ represents the column input to each row, $s'$ represents the column output of each row, $c$ represents the row carry input to each cell, $c'$ represents the row carry output to each cell, $w$ represents the weight digit stored in the cell, $\bar{w}$ represents the weight digit complementary to $w$, $x$ represents the sample for the row including that cell, $M$ represents the majority function, $t$ represents the trigger input to each cell, $t'$ represents the trigger output of each cell, $w^*$ represents the state of the cell after a trigger input is delivered to the first cell representing the least significant digit of the row, and $\oplus$ represents the exclusive-OR operation.

The arrays described above are useful for performing additions and subtractions, and, as earlier mentioned, find particular use in the construction of adaptive pattern recognition machines which require large numbers of high capacity threshold circuits. While a particular embodiment of the invention has been illustrated and described, it should be understood that many modifications and variations may be resorted to by those skilled in the art, and the scope of the invention is limited only by a just interpretation of the following claims.

I claim:

1. A threshold array for generating a weighted sum of inputs thereto comprising:

a plurality of logic row means, each having memory means for storing a number representation, a first row input, multiplying means for generating a representation of the product of a number representation stored in said memory means prior to the input of numbers to the threshold array and a number representation received on said first row input, and weight changing means for selectively changing the number representation in said memory means; and a plurality of adder means, each coupled to one of said logic row means for adding the product generated by the multiplying means in said row means and the sum generated by an adder means coupled to another row means.

2. A threshold array as defined in claim 1 wherein the weight changing means in each of said logic row means includes a trigger input and means responsive to signals on said trigger input for altering the number representation in said memory means in accordance with a signal on said first row input.

3. A threshold array for calculating a weighted sum of input numbers comprising:

a plurality of cells arranged in rows and columns, each column representing a particular binary digit position, and each row representing a weight to be assigned to one of said input numbers;

each cell having a memory representing a binary weighting digit of a value independent of an input number whose weighted sum, with other input numbers, is to be calculated, and means for altering the binary weighting digit representation in the memory in that cell;

a plurality of bus means, each connected to all of the cells of a row;

a plurality of first connecting means, each connecting a cell of a row to the cell of the next higher significant digit position of the same row;

a plurality of second connecting means, each connecting a cell of a column to a cell of the same column and of another row;

modulo-two means in each cell having an output connected to said second means, said modulo-two means responsive to digit representations on the first connecting means, on the second connecting means, on the bus connected to said cell, and on the memory of the cell, for generating the modulo-two sum of the digits on said first and second connecting means and the AND function of the digit on said bus and in said memory; and carry means in each cell having an output connected to said first connecting means, said carry means responsive to digit representations on the first connecting means, on the second connecting means, on the bus connected to said cell, and on the memory of the cell, for generating the binary carry of the sum of the digits on said first and second means and the AND function of the digit on said bus and in said memory.

4. A threshold array as defined in claim 3 including:

trigger means in each cell having a trigger input coupled to the memory of the cell for changing the digit representation in the memory; said trigger means including means responsive to said trigger input and the digit representation in said memory for generating a trigger output; and means connecting the trigger output of each cell to the trigger input of the cell in the same row and the column of the next most significant digit position.

5. A cellular threshold array for providing a complex weighting function of a plurality of inputs to said array comprising:

a. plurality of parallel adder circuits, each having a plurality of cells;

each of said cells having:

memory means defining a binary state representing one of two binary digits, the binary states of said memory means being independent of inputs to said array when said array is used to provide a function of inputs thereto, first, second and third inputs for receiving signals and first and second outputs for delivering signals, and logic means connected to said first and second inputs for providing signals to said first output representing the modulo-two sum of the digit represented by the state of the memory means of the cell, the digit on said first input, and the digit on said second input, and for providing signals to said second output representing the binary carry of the sum of the digits on said first and second inputs and a function of the binary state of said memory means of the cell; and a plurality of bus means each connecting together all of said third inputs of the cells in one adder circuit.

6. A cellular threshold array comprising:

a plurality of groups of cells having memories;

a first plurality of said cells being in a first memory state, said cells having first, second and third inputs and logic means providing a first output equal to the modulo-two sum of said first, second and third inputs and for providing a second output equal to the binary carry of the sum of the first, second and third inputs;

a second plurality of said cells being in a second memory state, said cells having first and second inputs and logic means providing a first output equal to the modulo-two sum of said first and second inputs and providing a second output equal to the binary carry of the sum of said first and second inputs;

means sequentially connecting said first output of each cell in a group to the first input of another cell in the same group;

means connecting said second output of each cell in a group to the input of a cell in another group; and a plurality of bus means, each connecting together said third inputs of each cell in the same group.

7. In a cellular threshold array including a multiplicity of cells arranged in operational rows and columns, the improvement of a plurality of cells, each comprising:

first, second and third inputs and first and second outputs;

a flip-flop including set and reset states and a first flip-flop output carrying signals representing a one when said flip-flop is set;

an AND gate, exclusive-OR gate and MAJORITY gate, said AND gate having a first input connected to said first output of said flip-flop and a second input connected to said third input to said cell, and an output;

said exclusive OR gate having a first input connected to said output of said AND gate, a second input connected to said first input to said cell and a third input connected to said second input to said cell, and an output connected to said first output of said cell;

said MAJORITY gate having a first input connected to said output of said AND gate, a second input connected to said first input to said cell, a third input connected to said second input to said cell, and an output connected to said second output of said cell.

8. The improvement in a cellular threshold array as defined in claim 7 including:

a flip-flop trigger input part on each of said flip-flops for receiving pulses for changing the state of the flip-flop;

a cell trigger input and cell trigger output connected to said cell;

means connecting said cell trigger input to said flip-flop trigger input;

second exclusive-OR means having a first input connected to an output of said flip-flop which carries a signal representing one only when said flip-flop is in a reset state, a second input connected to said third input to said cell and an output; and a second AND gate having a first input connected to said cell trigger input and a second input connected to said output of said second exclusive OR means, and having an output connected to said cell trigger output.

9. A threshold array comprising:

a plurality of logic row means, each having a row input and a plurality of cells, each cell having a position corresponding to a particular digit position of predetermined significance and each cell including:

a binary memory, an AND gate having a first input connected to said row input, a second input connected to said binary memory of said cell, and an output, a modulo-two adder for generating the modulo-two sum of binary inputs thereto, said adder having first, second, and third inputs, said third input coupled to the output of said AND gate, and carry means for generating the binary carry of the sum of inputs thereto, said carry means having first, second, and third inputs, said third input coupled to the output of said AND gate;

a plurality of first means for coupling the output of the modulo-two adder of each cell to said first inputs of the modulo-two adder and carry means of the cell in another logic row means; and a plurality of second means for coupling the output of the carry means of each cell to the second inputs of the modulo-two adder and carry means of the cell of next higher significant digit position in the same logic row means.

10. A cellular threshold array comprising:

a plurality of cells operationally arranged in column lines and row lines, each cell having majority gate means including first, second and third inputs and an output, and exclusive-OR gate means having first, second and third inputs and an output;

first connector means connecting the output of the majority gate means of each cell to the first input of the majority gate means and the first input of the exclusive-OR gate means of the next succeeding cell in the same row;

second connector means connecting the output of the exclusive-OR gate means of each cell to the second input of the majority gate means and the second input of the exclusive-OR gate means of the next succeeding cell in the same column;

bus means for carrying a binary signal to all cells of the same line; and means in each cell for coupling a binary function of the signal on said bus means to the third inputs of the majority gate means and the exclusive-OR gate means of that cell.

11. A cellular threshold array as defined in claim 10 wherein said means for coupling a binary function of the signal on said bus means includes memory means, and means responsive to the binary state of said memory means for selectively delivering the signal or complement of the signal on said row bus means to said third inputs of said gate means.

12. A cellular threshold array as defined in claim 11 wherein each of said memory means includes trigger input means for changing its binary state and trigger output means responsive to the signal on said bus means and the state of said memory means for generating a trigger output signal; and including trigger connectors connecting the trigger output signal from each cell to the trigger input means of a next succeeding cell in the same line.